United States Patent [19]

Ouellette et al.

[11] 4,112,776
[45] Sep. 12, 1978

[54] EARTHQUAKE SIMULATOR

[75] Inventors: Joseph Fernand Ouellette, Glendale; David L. Poeling, St. Charles, both of Mo.

[73] Assignee: Ouellette Machinery Systems, Inc., St. Louis, Mo.

[21] Appl. No.: 728,126

[22] Filed: Sep. 30, 1976

[51] Int. Cl.² .............................................. B06B 1/14
[52] U.S. Cl. .......................................... 73/665; 73/666
[58] Field of Search ................ 73/71.6, 71.5 R, 67, 73/662, 663, 665, 666

[56] References Cited

U.S. PATENT DOCUMENTS

| 2,706,400 | 4/1955 | Unholtz | 73/71.6 |
| 3,393,555 | 7/1968 | Flannelly | 73/71.6 |
| 3,597,960 | 8/1971 | Otera et al. | 73/71.6 |
| 3,640,124 | 2/1972 | Verga | 73/71.6 |
| 3,699,807 | 10/1972 | Kerley et al. | 73/71.6 |

FOREIGN PATENT DOCUMENTS 735,953  6/1943  Fed. Rep. of Germany ............ 73/71.6

OTHER PUBLICATIONS

Dickie, "Hydraulic Vibrators", *Product Engineering,* 12-1957, pp. 94-98.

*Primary Examiner*—Stephen A. Kreitman
*Attorney, Agent, or Firm*—Rogers, Eilers & Howell

[57] ABSTRACT

An earthquake simulating machine has a vibrating platform mounted in a frame. The platform is driven by a hydraulic piston which reciprocates the platform through a lever system having a mechanical advantage of about ten to one. The vibration of the platform is isolated from the frame by shock absorbing bushings which support the lever system. Shock absorbing feet may be used to support the frame. The hydraulic piston is controlled by a hydraulic circuit and by an electrical circuit which provides the input to the hydraulic circuit. A feedback circuit monitors the output vibration of the platform.

1 Claim, 9 Drawing Figures

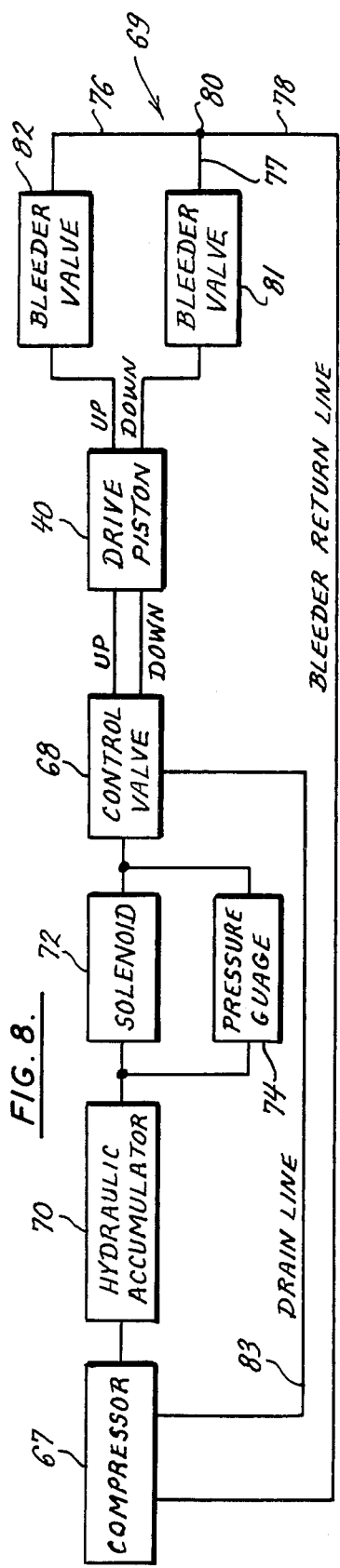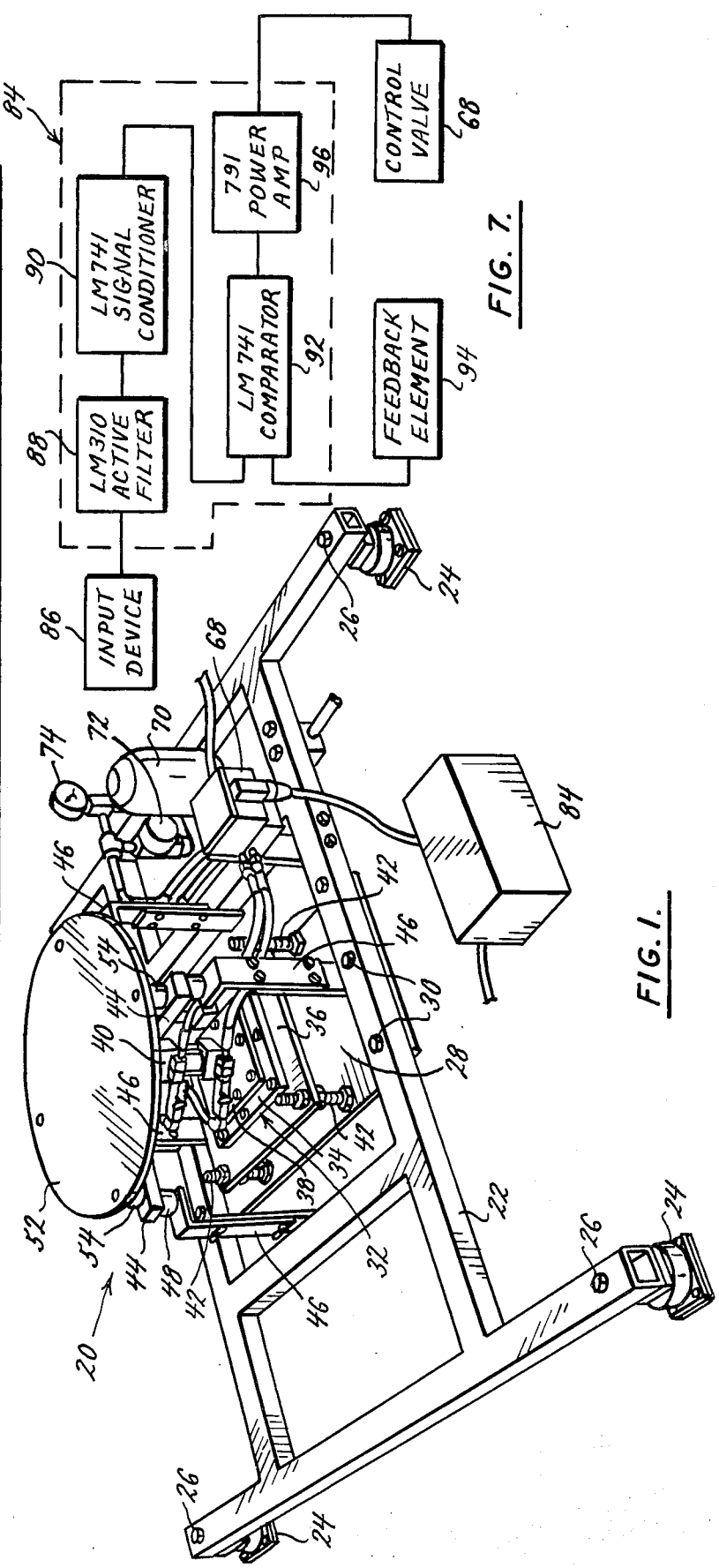

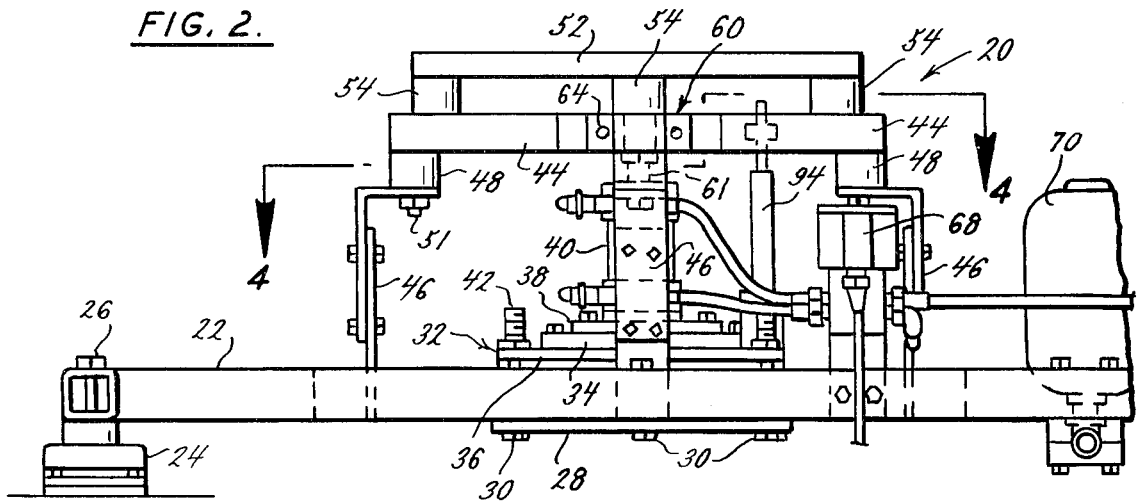
FIG. 2.
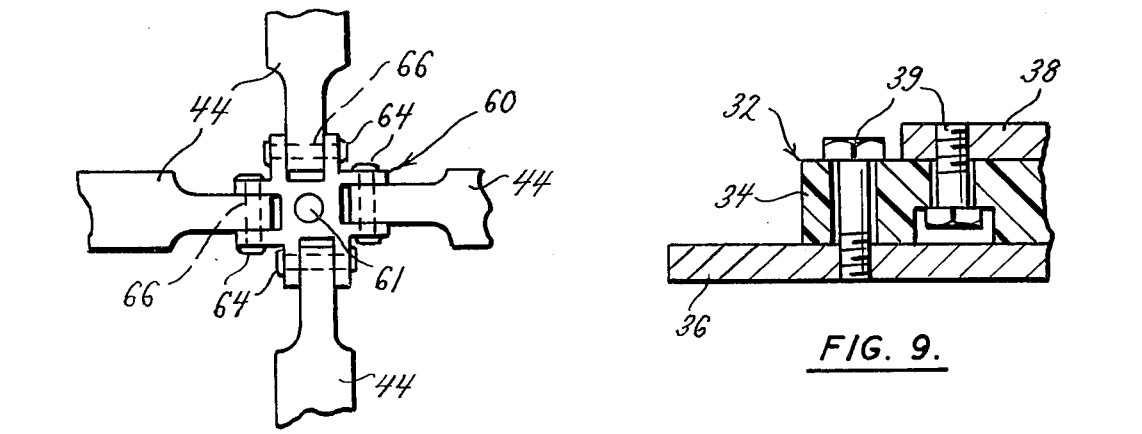
FIG. 3.
FIG. 6.
FIG. 9.

EARTHQUAKE SIMULATOR

BACKGROUND AND SUMMARY OF THE INVENTION

While almost everyone has experienced an earthquake of moderate strength, which rattles cups and saucers, very few people have been subjected to an earthquake comparable to the great San Francisco earthquake which occurred around the turn of the century and caused considerable damage. Having not experienced a large earthquake, most people would be interested in experiencing a demonstration which would resemble as closely as possible the real quake without the attendant danger. Applicants have succeeded in inventing a vibrating platform machine which will provide the trembling earth sensation required for such an earthquake simulation. When video and audio presentations accompany this trembling earth sensation, and the demonstration is conducted in a closed booth, a very realistic effect is created for the person in the booth.

It can be appreciated that there are several major problems that applicants had to overcome with their design that are inherent in such a machine.

Perhaps the hardest problem to solve is eliminating the transmission of vibration from the earthquake machine to the containing building. Any building which is subject to repeated vibration over an extended period of time will develop structural problems which it might not otherwise develop. If a design depends on anchoring the machine to bedrock to overcome this problem, the installation becomes very expensive and for all practical purposes is limited to ground floor installations. Applicants' design requires no special installation or mounting and is not restricted to use on the ground floor. Applicants' apparatus provides a vibrating surface while transmitting only a greatly attenuated vibration through its frame to the floor.

Another problem inherent in an earthquake machine is the danger of injuring people by providing too "hard" a shock, during a demonstration, which would possibly damage cartilage of the ankle or knee or injure the spine. A "hard" shock is produced in designs which too rapidly accelerate the person experiencing the vibrations produced. Applicants' design prevents against this by producing "soft" shocks.

Injury could also be caused by some designs if the control fails, causing the main driving means to drive the vibrating platform beyond its normal amplitude. This could seriously injure anyone experiencing the demonstration as well as possibly damaging the machine. Applicants' design avoids this possibility.

DESCRIPTION OF THE DRAWINGS

FIG. 1 is an overall view of the machine.
FIG. 2 is a side view, as viewed from the long side.
FIG. 3 is a side view as viewed from the short side.
FIG. 6 is a detailed view of the collar and hinge pin assembly taken along lines 6—6 of FIG. 5.
FIG. 7 is a schematic of the signal generating and feedback circuit.
FIG. 8 is a schematic of the hydraulic circuit.
FIG. 9 is a partial sectional view of the sandwich plate.

DESCRIPTION OF THE PREFERRED EMBODIMENT

Figure 4:
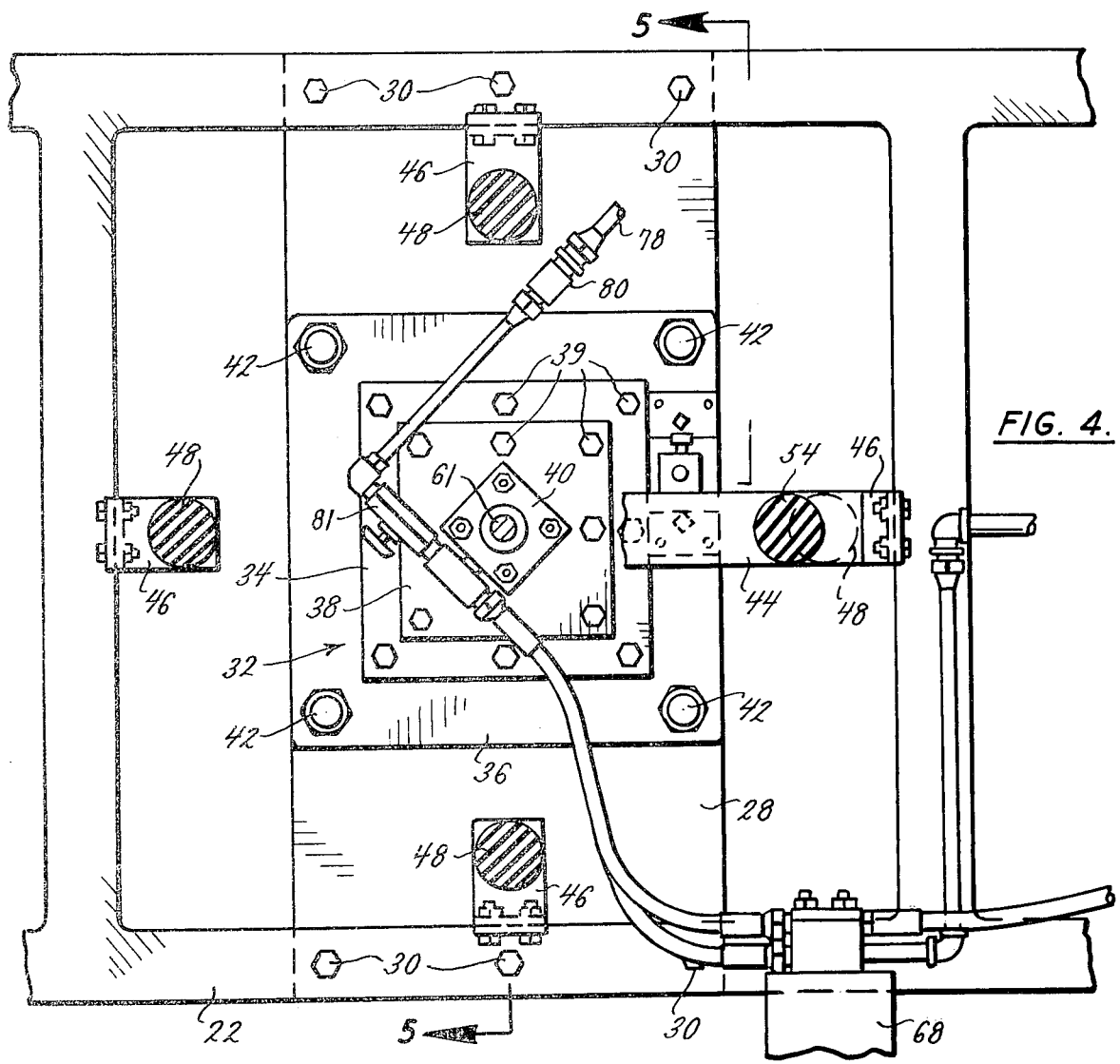
FIG. 4 is a cutaway top view as taken along lines 4—4 of FIG. 2.

Applicants' desing incorporates a hydraulic drive/power system (FIG. 8) which is controlled by an electrical system to vibrate a platform. Hydraulic, electric and pneumatic systems could be used interchangeably to provide the drive power or control for the machine without deviating from the concepts of the invention.

The hydraulic drive system has a source of hydraulic fluid under pressure, an interface circuit to regulate pressure, an electrically controlled hydraulic valve, and a main drive piston.

An electrical (FIG. 7) system is used to control the hydraulic drive system. The electrical system has an input device for reading in the amplitude and frequency of the desired shock pattern, a platform feedback position, an electronic logic control which evaluates the input and feedback signals and generates the signal which operates the hydraulic valve, and an optional D.C. power supply for the electronic logic control.

The mechanical structure of the machine (FIG. 1) has a tubular frame with shock absorbing machine feet and a steel plate on which is mounted a multiple layer, shock absorbing sandwich sub-plate. This sandwich sub-plate has layers of materials with different vibrational qualities which reduces the amount of shock transmitted to the frame. Brackets extending upward from the frame provide the mounting points for the driving arms which in turn provide the mounting points for the platform. Between the brackets and the driving arms, and between the driving arms and the platform are spacers which absorb and dampen the vibration generated by the driving arms.

By slightly binding the platform mounting, a snaking effect or sideways motion may also be achieved when the platform is vibrated. This is desirable, as a snaking effect is sometimes evident in a real earthquake. A snaking effect could be achieved by providing another drive system and another channel of the present control system. This latter method would be more expensive, but would provide additional means of controlling the magnitude of the effect.

The platform mounting points are offset inboard of the driving arm mounting points (FIG. 2). This offset enables the driving arms to work with a lever action in driving the platform, with the driving arm mounting point acting as the fulcrum. This greatly reduces the deflection at the bracket for any desired platform deflection (usually about 50 microns.)

The shock and vibration transmitted to the frame is directly related to the vertical deflection transmitted by the mounting bracket. The lever action design coupled with the shock absorbing spacers are extremely effective in greatly reducing the vibration transmitted by the bracket to the frame. The deflection measured by a seismograph placed on the platform while simulating an earthquake intensity of 6 on the Mercalli Scale is approximately fifty times that measured by the same seismograph when placed on the tubular frame. The attenuated vibration induced in the frame is isolated from the floor by the use of shock absorbing machine feet. These feet are of the conventional type used to isolate large machines which tend to vibrate and transmit vibration.

As shown in FIG. 1, the earthquake simulator 20 has a tubular metal frame 22 having four shock cushioning machine feet 24 attached by bolts 26 at the corners. A metal plate 28 is bolted with bolts 30 to the center of the frame 22 and is used for mounting the sandwich plate 32. The sandwich plate 32 is made up of a plate of Delrin (TM) 34 or any other similar plastic between two metal plates 36 and 38, which are bolted together with bolts 39 and mounted on the metal plate 28.

This sandwich plate 32 reduces the transmission of shock and vibration from the main drive piston 40 mounted thereon to the frame 22 because of the different vibrational modes of the material comprising the sandwich plate 32 and the decoupling effect of using separate bolts 39 to fasten the plastic plate 34 to each of the metal plates 36 and 38 as shown in FIG. 9.

The sandwich plate 32 is stud mounted to the metal plate 28 with four stud and nut assemblies 42, as shown in FIG. 1. These stud and nut assemblies 42 are adjustable to allow for proper leveling of the main drive piston 40 in relation to the driving arms 44, as shown in FIG. 2.

Four brackets 46 are bolted to the frame 22 and extend upward to provide the mounting points for the driving arms 44. These brackets 46 are preferably flexible to partially absorb the shock and vibration induced by the driving arms 44; ordinary steel strap has been found to have sufficient flexibility, but other materials could be used.

The driving arms 44 are connected to the brackets 46 by bushings 48 and bolts 50 and 51. The platform 52 is connected to the driving arms 44 by bushings 54 and bolts 56, 57.

Figure 5:
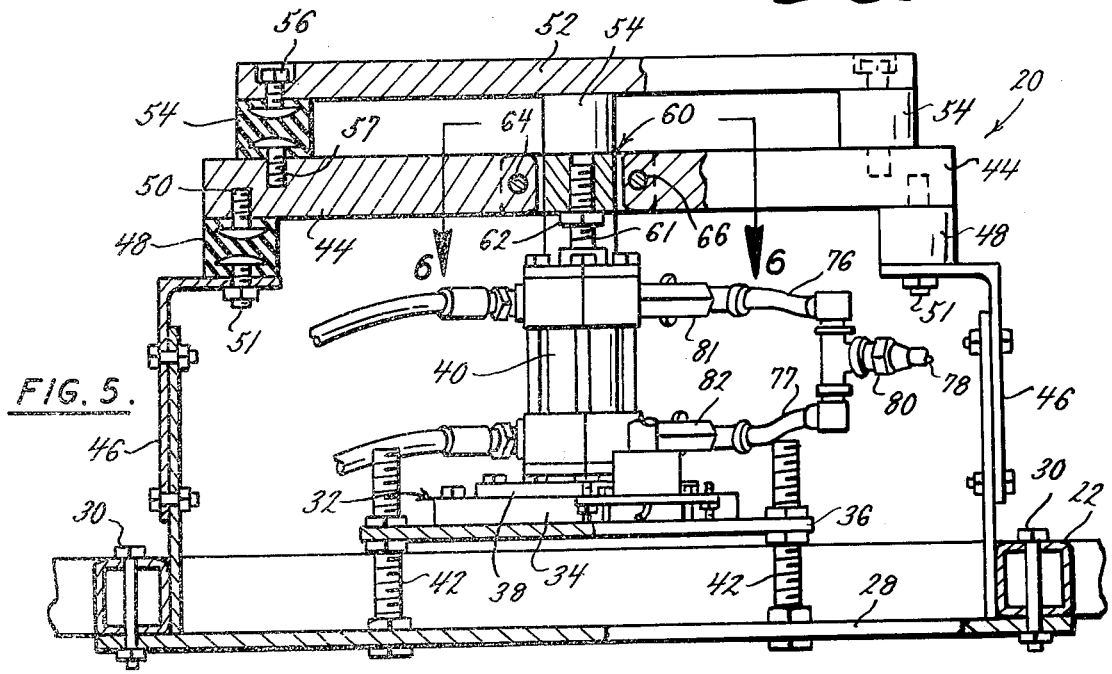
FIG. 5 is a cutaway short side view as taken along lines 5—5 of FIG. 4.

As can be seen from FIG. 5, the mounting bushings 54 for the platform 52 are offset inboard of the mounting bushings 48 for the driving arms 44. This offset allows the driving arms 44 to work in a lever type action gearing down the total travel of the main drive piston 40 in the ratio of the length of the driving arms 44 to the amount of the offset. This ratio is approximately ten to one in the preferred embodiment of applicants' device but other ratios could be used to provide different operating characteristics. If the control malfunctions and drive piston 40 is driven to its maximum extension, the gearing down will maintain the increased amplitude in the same order as the desired vibration. The machine would not be damaged. Bushings 48 and 54 are rubber bumper shock spacers which cushion and dampen the vibration of the platform 52 as well as providing the elastic pivot points for levers 44.

The main drive piston 40 is mounted on the sandwich plate 32 and connects to the driving arms 44 by means of a collar 60, as shown in FIG. 6. Collar 60 is threaded onto the shaft 61 of the main drive piston 40 and fixed by lock nut 62, as shown in FIG. 5. Collar 60 has freely rotatable pins 64 which fit through holes 66 in the driving arms 44. The pins 64 allow the collar 60 to move up and down at a fast rate without bending arms 44 or developing excess heat due to friction.

The simulator 20 is powered by the compressor 67 which operates drive piston 40. Power to drive piston 40 is controlled by control valve 68. The action of the compressor 67, valve 68 and piston 40 is regulated by the pressure regulating circuit 69. Piston 40 is preferably a double acting hydraulic piston. A double acting hydraulic piston model MHBXIDK obtained from Sheffer Corporation has been found to operate satisfactorily as piston 40. Control valve 68 is preferably a fast acting servo valve. A servo valve model DSVHS-600-S obtained from Parker Hannifin has been found to operate satisfactorily as control valve 68.

In the preferred embodiment, the pressure regulating circuit 69 has a pressure accumulator 70, an on-off solenoid valve 72 and a pressure gauge 74. The accumulator 70 prevents sudden losses in hydraulic pressure being applied to the piston 40 as it responds to the command variations of servo valve 68. The pressure gauge 74 is used to monitor the hydraulic pressure during operation. The hydraulic pressure is normally 350 p.s.i. Also shown are bleeder lines 76, 77 which are "teed" into a single return line 78 by a Tee connection 80. These are used when first setting up the machine to bleed the main drive piston 40. Needle valves 81, 82 are included in each bleeder line 76, 77 for "dithering" the servo valve system and thereby improving the performance characteristics of the simulator 20. "Dithering" is accomplished by adjusting the needle valves 81, 82 to a constant level of pressure drop so that the double action drive piston 40 is in an agitated condition and thusly more sensitive to a change in input pressure supplied by control valve 68. This reduces the response time of the drive piston 40 as the pressure buildup rate is constant for any particular control valve 68, but the required input pressure to trigger the drive piston 40 is reduced from the non-dithering level, hence reducing the time delay from the control valve 68 initiating a move command to the triggering of the drive piston 40. "Dithering" also increases the accuracy capabilities of the simulator 20 in following any input vibration pattern as the overall system sensitivity of the simulator 20 is increased.

A more sophisticated "dithering" can be applied to the drive piston 40 by using a valve arrangement to respond to changes of pressure which would further decrease the overall system response time. This sophisticated "dithering" would be useful in scientific applications requiring a much more accurate reproduction of the desired vibration pattern. "Dithering" could also be used in an electrically operated simulator 20 where the drive piston 40 would react to voltage levels by applying a float voltage to the drive piston 40. Similarly, a pneumatic control system could be "dithered" to enhance simulator 20 performance.

A regulated supply of pressurized hydraulic fluid from regulating circuit 69 is used to operate the main power piston 40 by the fast acting servo control valve 68. When it is desired to raise the platform, the control valve 68 receives an "up" signal from the electronic control 84 which causes the control valve 68 to open the line of pressurized fluid to the "up" cylinder of piston 40. This causes the shaft of the piston 40 to extend, thereby raising the platform. When it is desired to lower the platform, the control valve 68 receives a "down" signal from the electronic control 84 which closes the line of fluid to the "up" cylinder and opens the line of fluid to the "down" cylinder of the piston 40, thereby driving the platform downward.

By mounting the platform 52 in a slight bind, a slight sideways motion or snaking effect is produced as well as the up and down motion when the platform 52 is operated. This is desirable as a slight snaking effect can be felt in most earthquakes. A separate driving means could also be used to drive the horizontal plane. Control of the snaking effect produced by the separate drive means could be added by using another channel in the input signal or by multiplexing and decoding in the same channel. Feedback could be provided by a piston similar to that presently used for the up and down motion. By controlling the snaking effect, a more accurate representation of an earthquake could be produced for precise scientific applications of the machine. This increased control over the snaking effect, however, is not normally noticeable to people experiencing an earthquake demonstration.

The acceleration of the platform in its excursion up and down is controlled by the use of a single main drive piston 40 and the hydraulic control system 69. The acceleration could also be made variable by adding more control valves similar to valve 68, by using a multi-orifice control valve, or by providing for means to exhaust the fluid from the opposing side of the main power piston 40 while supplying the fluid to the driving cylinder. By varying the acceleration, subtle niceties (desirable in scientific applications) could be added to enhance the already realistic effect possible with the preferred embodiment.

The electronic logic 84 is depicted in FIG. 7 and is one of many such circuits that could be employed in the invention. The various electronic components which are used can be purchased commercially from any electronic parts supplier. Applicants have chosen to use National Semi-Conductor and Fairchild Mfg. Company components and the part numbers used are of those manufacturers.

The input signal is generated by a tape reader, a signal generator, or any other source 86 which could supply the waveform of the vibration to be reproduced by the machine. This input signal is fed into an active filter 88, (National Semi-Conductor p/n LM310) which eliminates any signals of a frequency higher than 10 hz. from the input. This input is then conditioned and amplified by a signal conditioner 90, (Nat. Semi-Conductor p/n LM741) before being fed into a comparator 92 (Nat. Semi-Conductor p/n LM741). The comparator 92 compares this input signal with the signal generated by the platform feedback sensing element 94, which is directly proportional to the position of the platform 52, and produces a signal which is proportional to the difference between the desired position and the actual position of the platform 52. The output of the comparator 92 is amplified by a power amplifier 96 (Fairchild p/n 791) and supplied to the control valve 68 to bring the actual position of the platform 52 to the desired position. The electronic control logic 84 is thereby continually comparing and correcting the actual position of the platform 52 with the desired position which ensures an accurate reproduction of the desired waveform.

A simple toggle switch (not shown) similar to a light switch is mounted in the electronic control box 84 and is used to turn the power off and on.

Also not shown is an optional 28 V.D.C. power supply which converts 110V. A-C to supply power for the logic control circuitry, if 28 V.D.C. is not otherwise available.

It can be appreciated by one skilled in the art that there are many modifications which could be made to the specific form or arrangement of parts herein described without departing from the concept of the invention.

We claim:

1. A device to vibrate a surface having a frame, means in the frame mounting a plate, the mounting means including a first resilient mount connected to the plate, the resilient mount being connected to a driving lever, the driving lever being connected at one end to a second resilient mount and the second resilient mount being connected to a damping support connected to the frame, the driving lever being connected at a second end to a driving piston, the piston having a power cylinder capable of reciprocating the piston at a preselected frequency and thereby oscillating the driving lever to thereby oscillate the plate through the first resilient mount, the first and second resilient mounts being positioned to reduce the amplitude of the oscillations of the plate relative to the oscillations of the reciprocating piston, the power cylinder being mounted on a shock absorbing plate having a plurality of layers, at least two of the layers having different vibrational modes, the plate being mounted in the frame, valve means adapted to control a power source, the valve being connected to the power cylinder to actuate the cylinder at a preselected frequency in response to an input signal, means increasing the response sensitivity of the power cylinder, and a feedback cylinder connected to the plate to generate a positional feedback signal for comparison with an input signal, the frame having shock absorbing means to absorb vibration transmitted to the frame.

* * * * *